United States Patent
Sambonet et al.

(10) Patent No.: US 6,311,866 B1
(45) Date of Patent: Nov. 6, 2001

(54) FOOD WARMER WITH CONTROLLED-OPENING COVER

(75) Inventors: Sergio Sambonet; Ferruccio Vercellone; Fausto Rissone, all of Vercelli (IT)

(73) Assignee: Oneida Italy S.R.L. (IT)

( * ) Notice: Subject to any disclaimer, the term of this patent is extended or adjusted under 35 U.S.C. 154(b) by 0 days.

(21) Appl. No.: 09/269,259

(22) PCT Filed: Oct. 7, 1997

(86) PCT No.: PCT/EP97/05581

§ 371 Date: Mar. 22, 1999

§ 102(e) Date: Mar. 22, 1999

(87) PCT Pub. No.: WO98/15215

PCT Pub. Date: Apr. 16, 1998

(30) Foreign Application Priority Data

Oct. 10, 1996 (IT) ............................................. MI96U0676

(51) Int. Cl.⁷ .................................................. B65D 43/24
(52) U.S. Cl. .......................... 220/830; 16/306; 220/827; 220/912
(58) Field of Search ..................... 220/810, 830, 220/836, 840, 942, 841, 264, 827, 828, FOR 196, FOR 198; 16/277, 306, 307; 217/57, 60 R, 61, 60 E; 126/261

(56) References Cited

U.S. PATENT DOCUMENTS

| | | | |
|---|---|---|---|
| 1,930,841 | * 10/1933 | Miniere | 220/912 |
| 2,246,705 | * 6/1941 | Tyree | 220/830 |
| 2,325,897 | * 8/1943 | Waltman . | |
| 2,357,421 | * 9/1944 | Murray | 220/830 X |
| 3,251,336 | * 5/1966 | O'brien | 220/830 X |
| 3,333,726 | * 8/1967 | Belanger | 220/836 |
| 3,610,460 | * 10/1971 | Siklos et al. | 220/863 X |
| 3,734,076 | * 5/1973 | Kiziol . | |
| 3,810,275 | * 5/1974 | Smith . | |
| 4,169,538 | * 10/1979 | Bird et al. | 220/810 |
| 4,649,599 | * 3/1987 | Beller . | |
| 4,802,605 | * 2/1989 | Salmon et al. | 220/810 |
| 5,144,290 | * 9/1992 | Honda et al. | 16/306 X |
| 5,280,848 | * 1/1994 | Moore | 220/264 X |
| 5,360,132 | * 11/1994 | Edelhoff . | |
| 5,465,862 | * 11/1995 | Devlin | 220/830 |
| 5,529,205 | * 6/1996 | Corney et al. | 220/840 X |
| 5,583,322 | * 12/1996 | Leisinger et al. | 220/830 X |
| 5,638,838 | * 6/1997 | Lombardi | 220/840 X |
| 5,775,535 | * 7/1998 | Vercellone et al. | 220/827 X |
| 6,000,550 | * 12/1999 | Simpson et al. | 220/840 X |
| 6,033,015 | * 3/2000 | Husted | 16/307 X |

FOREIGN PATENT DOCUMENTS

| | | | |
|---|---|---|---|
| 2756635 | * 1/1979 | (DE) . | |
| 19814983 | * 10/1999 | (DE) . | |
| 70552 | * 6/1946 | (NO) | 217/60 E |
| WO 87/03185 | * 6/1987 | (WO) . | |

* cited by examiner

*Primary Examiner*—Allan N. Shoap
*Assistant Examiner*—Robin A. Hylton
(74) *Attorney, Agent, or Firm*—Schlesingerr Fitzsimmons Shlesinger

(57) ABSTRACT

A food warmer has a cover hinged on a flame by a pair of side hinges for rotation around an axis between a closed position and a fully open position, with there being present between the cover and the frame at least one spring for opposing the rotation moment generated by the weight of the cover. Each hinge includes a pivot element on the frame and a fork, shaped bracket on the cover releasably engagable with and rotatable on the associated pivot. A spring contained in at least one of said pivots reacts on the fork engaged therewith to oppose the rotation movement generated by the weight of the cover.

8 Claims, 2 Drawing Sheets

Tav. I

Tav. II

FOOD WARMER WITH CONTROLLED-OPENING COVER

Figure 1:
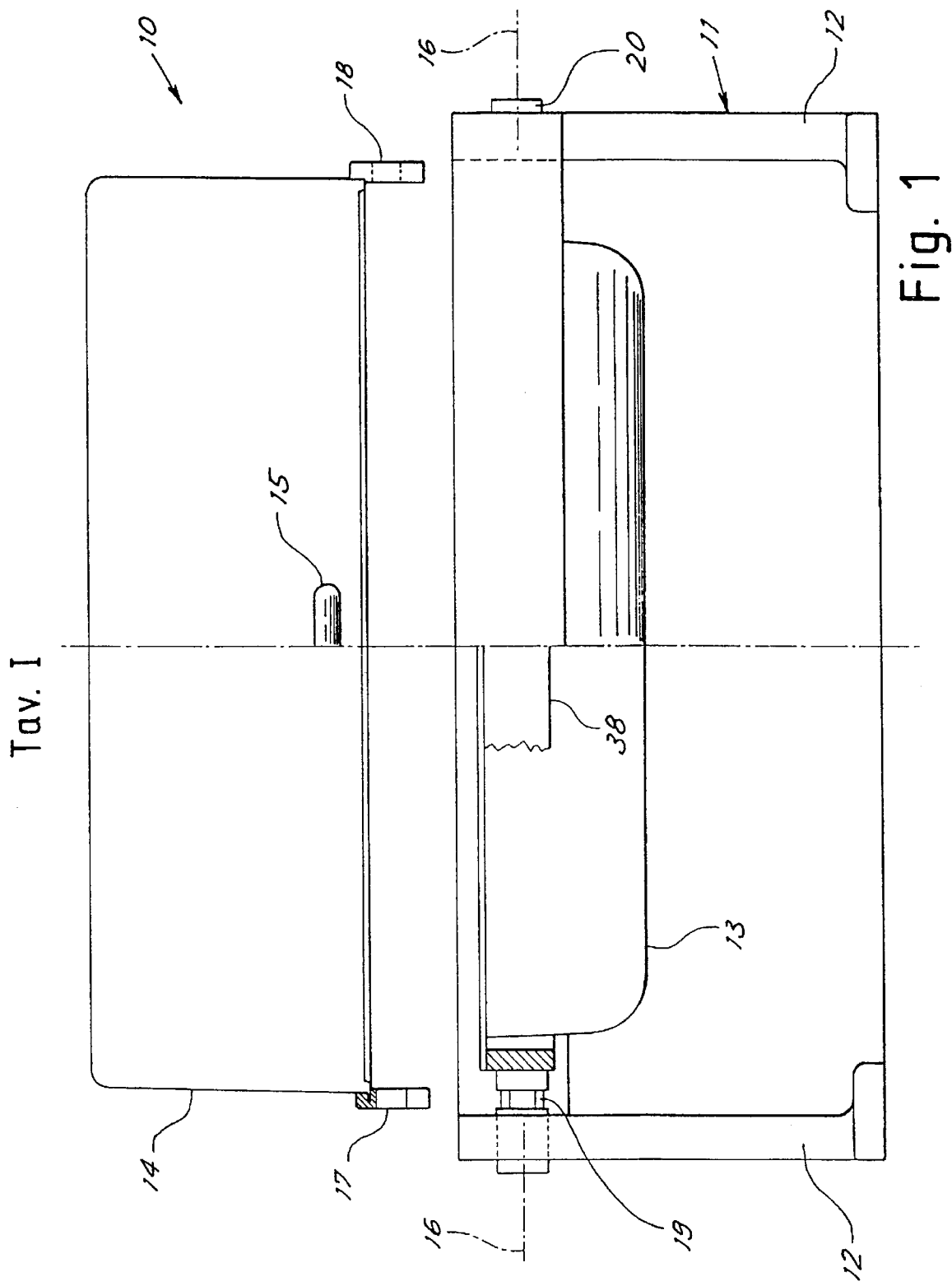

The present invention relates to a food warmer of the type comprising a tank designed to contain hot water for heating food in a double boiler and equipped with a cover pivoted in a rotatable manner around a horizontal axis to allow access to the tank when the food is to be placed therein or taken therefrom.

Food warmers of this type are in common use and are described eg in Italian patent application MI95U000272 filed by this applicant and where there is also shown how same can be equipped with devices for balancing the rotation moment given by the weight of the cover with the balancing devices consisting of gas springs arranged eg. in the supporting legs of the food warmer frame.

These prior art balancing devices while ensuring good handling of the cover and allowing easy disassembly of the tank, cover and frame for the necessary and frequent food warmer cleaning operations are relatively complicated and costly to produce.

In addition the arrangement of these devices must be suited from time to time to the specific aesthetic and structural design of the food warmer.

The general purpose of the present invention is to obviate the above mentioned shortcomings by supplying a food warmer whose cover can be operated in a simple manner and with high safety for the user and which would be produced in a simple and economical manner while also ensuring easy disassembly for cleaning.

In view of this purpose it was thought to provide in accordance with the present invention a food warmer with cover hinged on a frame by means of respective side hinges for its rotation around an axis of rotation between a closed position and a fully open position with there being present between the cover and the frame elastic reaction means for opposing the rotation moment generated by the weight of the cover and characterized in that each hinge comprises a pivot element on the frame and a radial engagement fork therein arranged on the cover with the elastic reaction means being contained in at least one of said hinge elements to react on the fork engaged therein.

Figure 2:
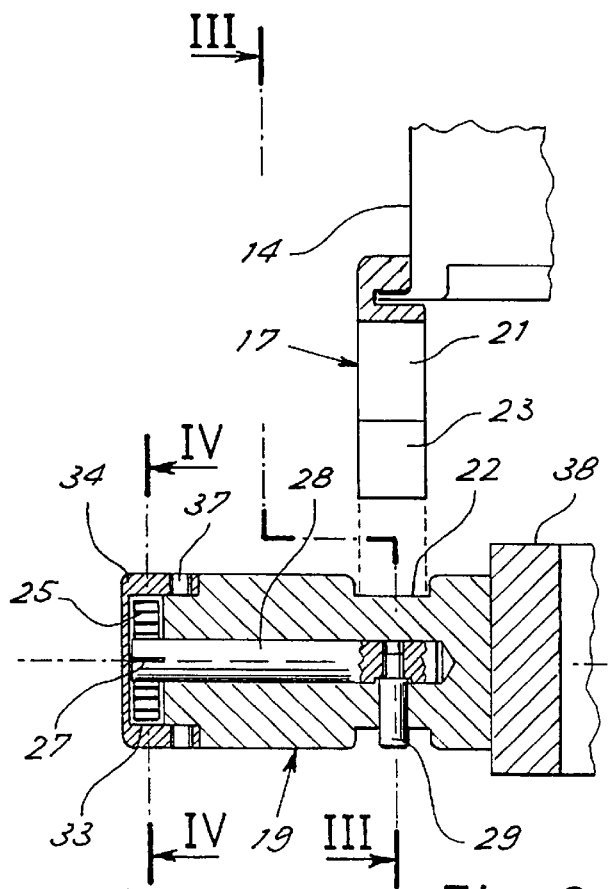
Figure 3:
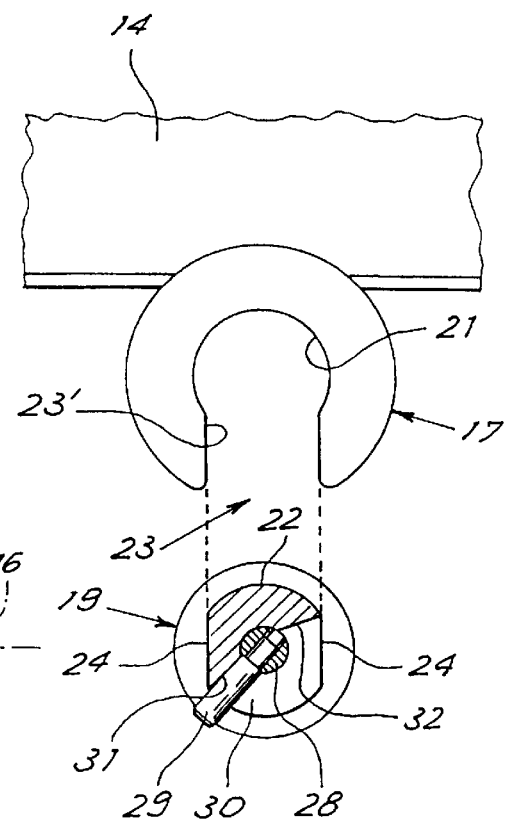
Figure 4:
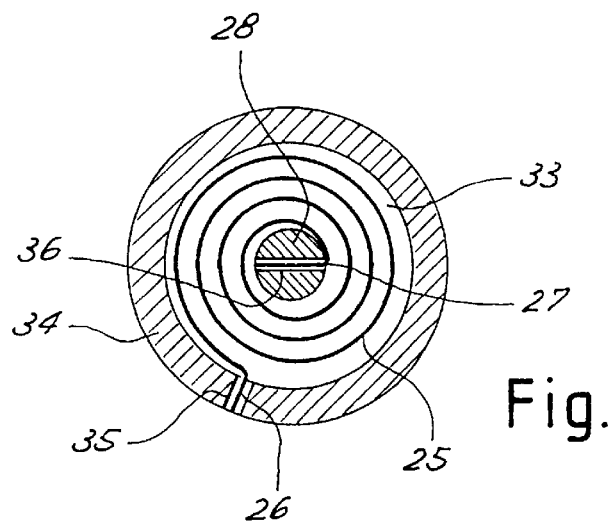

To clarify the explanation of the innovative principles of the present invention and its advantages compared with the known art there is described below by way of non-limiting example with the aid of the annexed drawings a possible embodiment thereof applying said principles. In the drawings:

FIG. 1 shows a partially cross sectioned and exploded front elevation view of a food warmer in accordance with the present invention, FIG. 2 shows an enlarged exploded view of a pivoting device of the food warmer cover of FIG. 1, FIG. 3 shows a view along plane of cut III—III of FIG. 2, and FIG. 4 shows a cross section along plane of cut IV—IV of FIG. 2.

With reference to the drawings, FIG. 1 shows diagramatically a food warmer indicated generally by reference number 10 and comprising a frame 11 with supporting legs 12 on which is supported a tank 13 designed to be filled with hot water for double-boiler heating of food contained in a suitable receptacle (not shown).

A cover 14 equipped with an operating handle 15 is hinged to the frame 11 for rotating around a horizontal axis 16 allowing opening and closing of the tank 13.

The means of hinging the cover 14 onto the frame 11 consists of side brackets 17, 18 of the cover which engage in respective fixed supporting pivots 19, 20 projecting laterally from the frame to identify the rotation axis 16.

As may be seen clearly in FIGS. 2 and 3 where for the sake of simplicity of illustration is shown only the left-hand hinging device, the one on the right being possibly symmetrical therewith, each bracket 17, 18 is formed like a fork with respective cylindrical seats 21 designed to couple with complementary cylindrical surfaces of hinging portions 22 of the pivots 19, 20.

Advantageously each cylindrical seat 21 has a peripheral opening 23 of a width less than its diameter while the hinging portions 22 have side flats 24 in accordance with two parallel chords to adapt to the width of the opening 23. In this manner the cover 14 can be lowered vertically in the closed position onto the frame 11 with the forks 17, 18 engaged with the hinging portions 22. Upon rotation of the cover the opening 23 falls into a position rotated angularly with respect to the flattened walls 24 to secure the cover against possible accidental disengagement from the frame.

In accordance with the present invention at least one of the two pivots 19, 20 is equipped with reaction means for opposing or resisting the rotation moment generated by the weight of the cover in its various positions included between the closed and the fully open positions.

The reaction means comprises a coil spring 25 arranged coaxially with the rotation axis 16, and has one end 26 thereof integral with the fixed frame 11 and its other end 27 connected kinetically with the movable cover 14.

Advantageously there is provided a shaft 28 rotatable around the axis 16 inside the pivot 19 and equipped opposite the hinged portion 22 with a radial pin 29 projecting radially through a cavity 30 from the above mentioned hinging portion to be engaged by a portion of the cover 14 and advantageously by a surface 23' of the opening 23 of the fork 17.

As may be clearly seen in FIG. 3 the cavity 30 extends angularly in the cross section of the pivot 19 at an angle essentially equal to the angle of fully opening of the cover 14 to identify surfaces 31, 32 which stop the cover in a closed or fully open position respectively.

FIG. 4 shows the arrangement of the spring 25. This spring is advantageously inserted in a housing 33 made in a plug or ringnut 34 applied on the external end of the pivot 19.

The end 26 of the spring is anchored in a seat 35 of the plug 34 which can be fixed integrally with the pivot 19.

The other end 27 of the spring is anchored in a seat 36 of the rotatable shaft 28. Opening of the cover 14 through the pin 29 and the shaft 28 causes change in the winding angle of the coil spring equal to the rotation angle of the cover to generate a reaction in a direction opposite to the rotation moment given by the cover weight.

It is now clear that the hinging device in accordance with the present invention with a coil spring interposed between the cover and the fixed frame permits supplying substantial balancing of the cover. In addition there can easily be provided an adjustment of the angular position of the ringnut 34 with respect to the pivot 19 to change the winding angle of the spring at rest. The reaction force of the spring can thus be calibrated according to the characteristics and the weight of the particular cover used. For example, the plug 34 can comprise stop dowels 37 on the body of the pivot 19.

Since the pivots 19, 20 are fixed with respect to the frame 11 it is easy to fix the supporting means of the tank 13 on the facing ends thereof. In FIGS. 1 and 2 the support means are made eg. in the form of a ring 38 in which the tank is inserted and supported.

The balancing device just described, contrary to those of the prior art, has extremely reduced dimensions and can be-housed inside the pivot to allow provision of various food warmer designs without compromising the good appearance or structure thereof. In addition the connecting mechanisms between the cover and the reaction means are fully protected since they are contained within the pivot.

Naturally the above description of an embodiment applying the innovative principles of the present invention is given merely by way of example and therefore is not to be taken as a limitation of the patent right claimed here.

For example, the exact form of the bracket-pivot coupling between the cover and the frame can change depending on the specific technical and aesthetic requirements.

In addition the food warmer could be equipped with a coil spring at only one pivot or both the pivots could be springless.

What is claimed is:

1. A food warmer with cover (14) hinged on a frame (11) by a pair of side hinges (17, 18, 19, 20) for rotation around an axis of rotation (16) between a closed position and a fully opened position and between the cover (14) and the frame (11) there being present means (25) for opposing the rotation moment generated by the cover weight and characterized in that each of said hinges comprise a pivot (19, 20) fixed on the frame (11) and a fork shaped bracket (17, 18) having therein a seat shaped for radial removable and pivotal engagement with said pivot arranged on the cover (14) and with said means (25) being contained in at least one of said pivots (19, 20) to react on the bracket (17, 18) engaged thereon.

2. A food warmer in accordance with claim 1 and characterized in that said means comprises a coil spring (25) wound axially around the rotation axis (16) of the cover (14) and with a first end (26) thereof interacting with the frame (11) and a second end (27) thereof interacting with the cover (14).

3. A food warmer in accordance with claim 1 and characterized in that said means comprises a spring constrained between said at least one pivot (19) which is integral with the frame (11) and a shaft (28) rotatable coaxially with the rotation axis (16) within the at least one pivot (19) with there being radially connected to the shaft (28) a pin (29) projecting radially from the at least one pivot (19) to react against the bracket (17) engaged on the at least one pivot.

4. A food warmer in accordance with claim 3 and characterized in that the pin (29) projects radially from the pivot (19) through a radial cavity (30) formed in the pivot opposite a curved surface (22) thereof for hinging with the cover (14).

5. A food warmer in accordance with claim 4 and characterized in that the cavity (30) extends angularly and part way around the pivot (19) at an angle virtually equal to the fully open angle of the cover (14) between stop surfaces (31, 32) on the pivot corresponding to the closed and fully open positions respectively of the cover.

6. A food warmer in accordance with claim 1 and characterized in that support means (38) of a tank (13) are fixed at facing ends of said pivots (19, 20).

7. A food warmer with cover (14) hinged on a frame (11) by a pair of side hinges (17, 18, 19, 20) for rotation around an axis of rotation (16) between a closed position and a fully opened position and between the cover (14) and the frame (11) there being present means (25) for opposing the rotation moment generated by the cover weight and characterized in that each of said hinges comprise a pivot (19, 20) fixed on the frame (11) and a fork shaped bracket (17, 18) having therein a seat shaped for radial removable and pivotal engagement with said pivot arranged on the cover (14) with said means (25) being contained in at least one of said pivots (19, 20) to react on the bracket (17, 18) engaged thereon said means (25) comprising a coil spring wound axially around the rotation axis (16) of the cover (14) and with a first end (26) thereof interacting with the frame (11) and a second end (27) thereof interacting with the cover (14), the spring (25) being inserted in a housing (33) within a ring nut (34) applied coaxially with the pivot (19) and having therein an anchoring seat (35) for accommodating one of the ends of the spring.

8. A food warmer in accordance with claim 7 and characterized in that the ringnut (34) is applied to the pivot (19) for adjustment of its angular position with respect to the pivot in such a manner as to make adjustable the winding angle at rest of the coil spring (25) between its ends (26, 27) constrained respectively to the pivot (19) and by means (28, 29) of kinematic connection with the cover (14).

* * * * *